May 12, 1936. W. L. AVERY 2,040,589
VEHICLE WHEEL
Filed May 14, 1934 3 Sheets-Sheet 1

W. L. Avery
INVENTOR

By: Marks & Clerk
Attys.

May 12, 1936.   W. L. AVERY   2,040,589
VEHICLE WHEEL
Filed May 14, 1934   3 Sheets-Sheet 2

W. L. Avery
INVENTOR

By: Marks & Clerk
ATTYS.

May 12, 1936.  W. L. AVERY  2,040,589
VEHICLE WHEEL
Filed May 14, 1934   3 Sheets-Sheet 3

W. L. Avery
INVENTOR

By Marks & Clerk
Attys.

Patented May 12, 1936

2,040,589

UNITED STATES PATENT OFFICE 2,040,589

VEHICLE WHEEL

William Leicester Avery, Thorley,
Bishop's Stortford, England

Application May 14, 1934, Serial No. 725,643
In Great Britain May 19, 1933

4 Claims. (Cl. 301—6)

This invention relates to vehicle wheels and has for its object to improve the construction of same.

According to the present invention a vehicle wheel is provided wherein the tyre rim is supported in part by the wheel hub and in part by a brake casing incorporated in the wheel.

Further features of the invention will be hereinafter described or indicated

In the accompanying drawings:—

Figure 1:
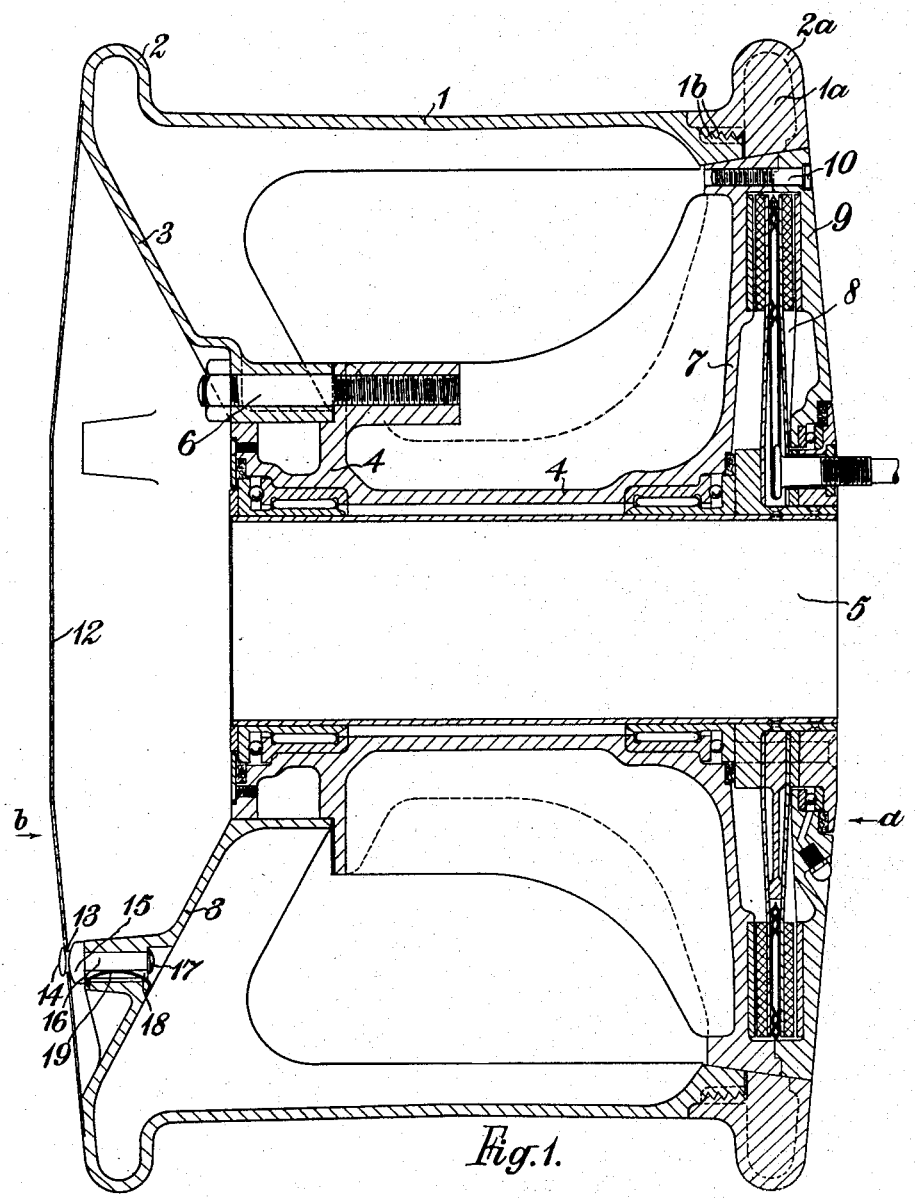
Figure 1 is a sectional elevation of a wheel according to this invention.

In carrying the invention into effect in one convenient manner as illustrated in the drawings a wheel is provided comprising a conventional flat base rim which, however, in the present case is divided circumferentially into two parts 1, 1ª, of which the part 1 includes one of the tyre retaining flanges 2 and is formed with an annular web 3 which forms one side of the wheel. The other tyre retaining flange 2ª is included in the other rim part 1ª and the latter is detachably connected with the previous rim part 1 preferably in such manner as will permit the two parts being readily interconnected with each other, so that the tyre may be retained on the rim, or readily disconnected, so as to facilitate removal of the tyre. The web 3 is centred at its inner periphery upon a central hub 4 rotatably mounted on the wheel spindle 5 and may be secured to this hub by one or more bolts 6, and the abovementioned co-relation of the rim parts 1, 1ª may be effected through the medium of interengaging castellations 1ᵇ of which, as shown in Figure 1, there are a plurality on each rim part arranged so that the castellations on the one rim part lie in the plane of the gaps formed between the axially adjacent castellations on the other rim part.

The arrangement is such that a partial rotation of the rim part 1ª in one direction will cause the castellations thereon to enter the gaps between the castellations on the other rim part, in which position the two rim parts are secured together. To remove the rim part 1ª the same is rotated in the opposite direction so that the castellations are moved out of engagement with one another.

Figure 2:
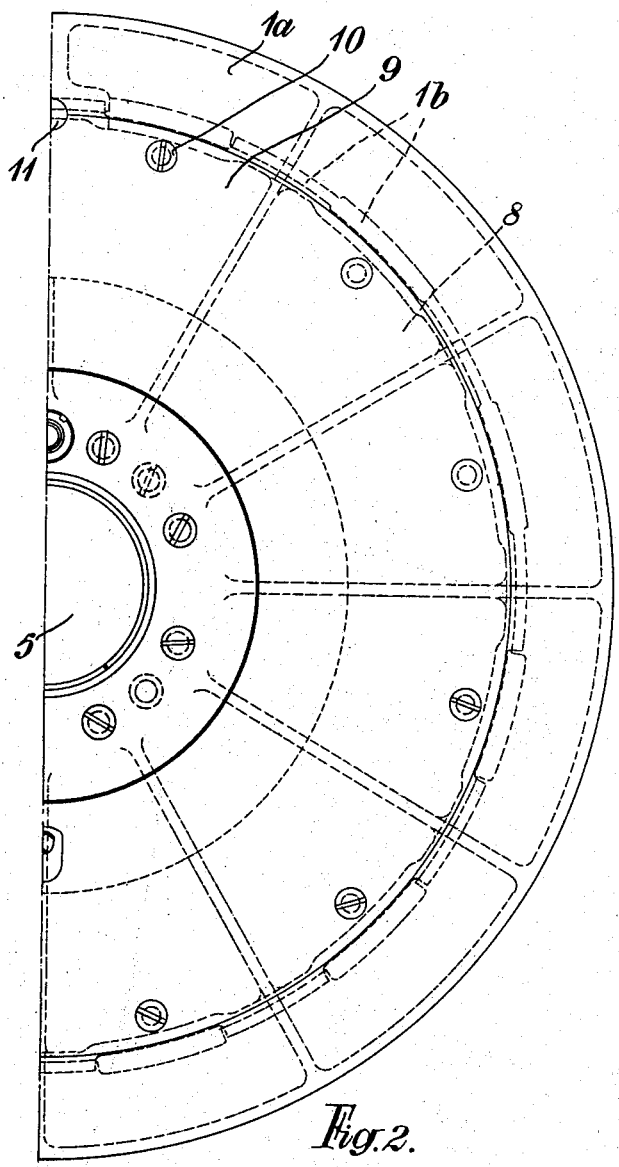
Figure 2 is an end view of one half of the wheel in Figure 1 looking in the direction of the arrow $a$.
Figures 3, 4:
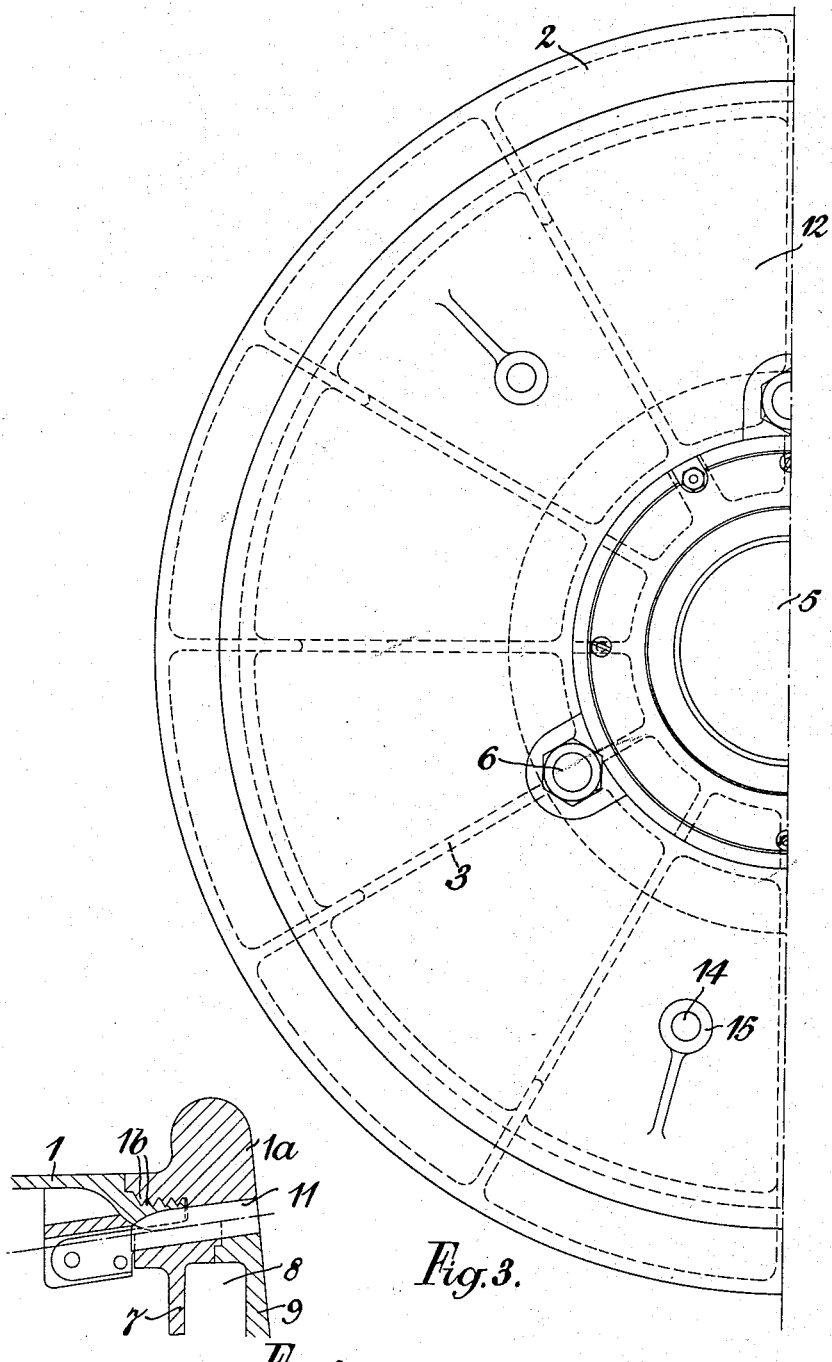
Figure 3 is a view similar to Figure 2 but looking towards the opposite end of the wheel, that is in the direction of the arrow $b$.
Figure 4 is a fragmentary view illustrating a detail.

The central hub 4 at the end thereof remote from that where the web 3 is supported is formed with a radial flange 7 which forms the inner side wall of a brake casing 8 and serves at its outer periphery to support the side of the wheel rim which is located in this neighbourhood, including the rim part 1ª. The outer side wall 9 of the brake casing is rotatably mounted on the hub 4 and is detachably connected at its outer periphery to the aforesaid radial flange 7 by means of bolts 10 for example, thus forming a complete brake casing which is correlated with the rim above it in such manner as to prevent relative rotational movement between the parts when assembled together, even on account of torque reaction, while enabling the parts to be readily dismantled when required and so enabling access to be had to the interior of the brake casing. For example the inner periphery of the rim part 1ª, the portion of the rim part 1 which engages with the brake casing and the outer periphery of the brake casing may be formed with interfitting recesses and projections which co-operate to prevent relative rotational movements of these parts or they may be formed to receive a number of studs 11 (Figures 2 and 4) which are accommodated within recesses formed between the said wheel parts and serve not only to secure the rim parts 1, 1ª together but also serve to equalize the torque stresses imposed upon these wheel parts.

The invention also extends to a vehicle wheel provided with a cover-plate 12 on the outside, which plate is removably secured in position by having openings 13 provided therein with which the projecting heads 14 of studs 15, removably supported in such side of the wheel engage. Each stud is formed, beyond its head, with a spindle 16 which latter, at its other end, is formed with a retaining flange 17 and said spindle together with the said flange is passed through an opening 18 formed in the wheel and the stud is retained in this opening by the action of a spring 19 therein pressing against the spindle. The opening 18, being of greater diameter than the spindle, a slight rocking movement of the stud 15 is permitted, so that the projecting head thereof may be readily located for engagement with the appropriate opening in the cover-plate.

It is to be understood that the invention is not limited to the above details but may be modified to meet any particular requirements or conditions to be fulfilled. Thus, for example, the invention may be applied to a wheel having a well base rim formed in a single piece while the annular web 3 may be substituted by tension spokes particularly when the wheel is of a large diameter.

I claim:

1. A vehicle wheel for carrying a pneumatic tyre comprising a rim having tyre retaining flanges around the peripheral edges thereof, an annular flange extending from one such tyre retaining flange to a hub to which the said annular flange is secured, an annular member extending vertically and without change of direction from immediately below said other tyre retaining flange to the said hub and a still further annular member extending in a like manner to the last-mentioned member from the said tyre retaining flange to the hub and spaced from its companion member, so as to form a brake housing between the two such members.

2. A vehicle wheel for carrying a pneumatic tyre comprising a rim having a tyre retaining flange thereon at one peripheral edge thereof and an annular flange which extends radially inwards from such rim edge to the wheel hub to which this flange is secured, another tyre retaining flange at the other peripheral edge of the rim detachably secured to the latter so that this tyre retaining flange can be removed from the wheel rim, an annular member on said hub extending vertically without change of direction from the hub to the edge of the rim where the detachable tyre retaining flange is located and which rim edge is seated upon the outer periphery of this annular member, and a further annular member spaced from the first-mentioned annular member and extending vertically from the hub to the detachable tyre retaining flange which is seated in part upon this second-mentioned annular member and in part upon the companion and first-mentioned annular member, these two vertical annular members forming a brake housing between them.

3. A vehicle wheel for carrying a pneumatic tyre comprising a rim having a tyre retaining flange formed integral therewith at one peripheral edge of the rim, an integral flange on said rim edge which extends radially inwards to a hub to which the flange is secured, a tyre retaining flange at the other peripheral edge of the rim, means adapted to connect this tyre retaining flange with the rim in a readily detachable manner, a flange integral with said hub which extends vertically therefrom to the underneath surface of the rim at the edge thereof where the detachable tyre retaining flange is secured so that this vertical flange affords a support for the rim, and means engageable with the opposed engaging surfaces of the said rim edge and removable tyre retaining flange and the outer periphery of said vertical flange for securing these parts against relative motion.

4. A vehicle wheel as claimed in claim 3 wherein the said engaging surfaces are tapered.

WILLIAM LEICESTER AVERY.